(No Model.)
W. H. ECKERT.
TRANSMISSION OF RAPIDLY ALTERNATING ELECTRIC CURRENTS.
No. 512,102. Patented Jan. 2, 1894.
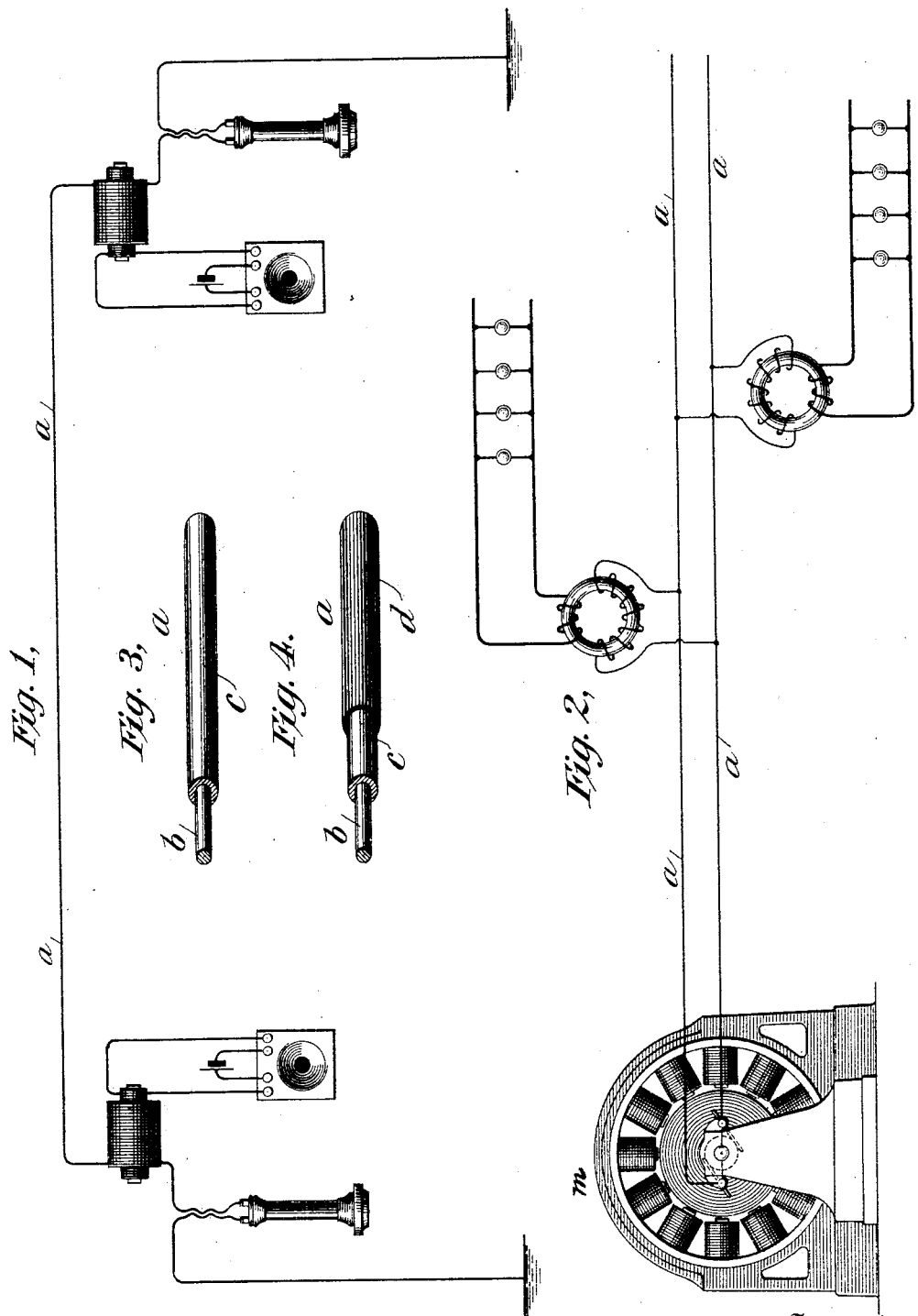
Witnesses
C. E. Ashley
John C. Sanders
Inventor
W. H. Eckert
By his Attorney
C. L. Buckingham

UNITED STATES PATENT OFFICE.

WILLIAM H. ECKERT, OF NEW YORK, N. Y.

TRANSMISSION OF RAPIDLY-ALTERNATING ELECTRIC CURRENTS.

SPECIFICATION forming part of Letters Patent No. 512,102, dated January 2, 1894.

Application filed October 11, 1893. Serial No. 487,849. (No model.)

*To all whom it may concern:*

Be it known that I, WILLIAM H. ECKERT, a citizen of the United States, residing in the city, county, and State of New York, have made a new and useful improvement in telephonic transmission and in the art generally of distributing or transmitting alternating currents for power and other purposes, of which the following is a specification.

My invention for the most part consists in the discovery that telephonic transmission, or rapidly alternating currents in general, may be more perfectly effected upon a bimetallic conductor, such as steel and copper in substantially equal parts, than upon a conductor of one material, such as copper; and with the advantage that such transmission may be effected upon a circuit consisting of a single composite wire and an earth return as perfectly as though two copper wires, each of equal conductivity, were arranged in a closed metallic circuit. In other words, I find that a single bimetallic conductor joining two distant points is a more perfect medium for telephonic transmission and for conveying generally rapidly alternating currents than are two copper conductors, each of a resistance equal to that of the bimetallic wire; and that from this fact the two conductors necessary to form a single metallic circuit may be replaced by a single wire costing little, if any, more than one-half of a copper metallic circuit. I have also discovered that less insulation is needed to protect a bimetallic wire than is necessary for copper or other single-substance conductors, in the transmission of rapidly alternating currents, and that from this fact not only the expense of constructing cables, whether aerial, underground or submarine, may be greatly reduced, but more wires may be placed within a cable than could be done if the usual thickness of insulation were used. Moreover, for the transmission of alternating currents, wires of smaller conductivity, according to the ordinary resistance measurements, may be used than is possible if they were constructed of copper, iron or other single metal.

I am aware of what is popularly termed the "Ferranti effect" and that it has long been known that in the mains of Ferranti's circuit potentials are higher at a distance than at the source of generation; but notwithstanding prior knowledge of this law or effect, I believe I am the first to point out the fact that alternating transmissions are aided or made more perfect by the use of bimetallic conductors. The "Ferranti effect" is associated with a circuit in which one main is placed as an insulated wire within a conducting tube forming the return, and in this respect the organization bears a remote resemblance to my bimetallic wire. The difference, however, is obvious, and even if alternating transmissions by the Ferranti cable are aided by such an organization it does not negative my right to claim two dissimilar conductors in metallic contact with each other to form the single conductor of a metallic circuit, or to form one branch of a circuit which is completed by an earth return.

Either iron or steel may be used with copper, but steel is better adapted to the purposes of bimettallic wire and its use in transmitting alternating currents to great distances. Other dissimilar metals of essentially different specific resistances may be used to advantage in transmitting alternating currents, but to what extent their adoption would be benefical I am unable to state. In comparing my bimetallic conductor with those of a single substance I have pointed to the fact that a single wire with an earth return may replace a metallic circuit of two equally good copper conductors; but I do not intend to limit my use of bimetallic wire to circuits having earth returns, as it is equally applicable to all other arrangements of conductors upon which rapidly alternating currents are carried.

In the use of either steel or iron with copper, while the two metals should be represented by approximately equal masses or cross-sections, there may be an excess either of copper or iron, and particularly of the latter for telephonic transmission, without materially departing from the advantages of a bimetallic conductor for carrying such currents.

In the accompanying drawings Figure 1 represents a telephone system in which receiving and transmitting instruments are joined by a bimetallic conductor. Fig. 2 represents an alternating-current dynamo and an electric-light system which is fed through bimetallic conductors. Fig. 3 shows a bimetallic wire consisting of an iron or steel core and a copper coating. Fig. 4 shows a like bimetallic wire having an insulating covering, I.

My improved method or art may be practiced independently of particular forms of apparatus, but, as an illustration, I have shown an arrangement in which my invention is present in Fig. 1 of the drawings, consisting of a telephonic system with transmitting and receiving instruments at two distant stations, joined by a metallic wire $a$, shown in Fig. 3 as having an iron or steel core $b$, upon which is superposed a copper covering $c$. Another instance is represented in Fig. 2, in which a similar bimetallic conductor, shown in Fig. 4, having a steel or iron core $b$, a copper coating $c$, and an insulating covering $d$, is used for conveying the pulses of an alternating generator $m$ to a distance for light, heat or power.

What I claim, and desire to secure by Letters Patent, is—

1. The improved art or method of transmitting telephonic messages, which consists in developing a series of alternating electrical pulses representing said messages, and in transmitting said alternating pulses over a conductor of bimetallic wire consisting of iron or steel combined with copper or other dissimilar metals of specifically different resistances, as and for the purpose set forth.

2. The improved art or method of transmitting alternating currents to a distance, which consists in the generation or development of a series of rapidly alternating electrical currents and in the transmission of said pulses over a bimetallic conductor consisting of dissimilar metals, as and for the purpose set forth.

3. The improved art or method of transmitting alternating currents to a distance, which consists in generating a series of rapidly alternating electric currents, and in the transmission of said pulses over a bimetallic conductor consisting of iron or steel combined with copper, as and for the purpose set forth.

4. The improved art or method of transmitting electrical pulses to a distance and of isolating them from neighboring objects, which consists in generating a series of rapidly alternating currents, and in the transmission of such pulses over a bimetallic conductor consisting of dissimilar metals, covered with an insulating coating, as and for the purpose set forth.

WILLIAM H. ECKERT.

Witnesses:
JAMES J. MURPHY,
JOHN C. SANDERS.